United States Patent
El-Rayes et al.

(10) Patent No.: US 7,341,080 B2
(45) Date of Patent: Mar. 11, 2008

(54) METHOD FOR LOADING POURABLE MATERIAL AND DEVICE FOR CARRYING OUT SAID METHOD

(75) Inventors: Mohamed Tarek El-Rayes, Florian (AT); Reinhard Pum, Traun (AT); Reinhard Redl, Linz (AT); Johann Wurm, Bad Zell (AT); Rainer-Walter Kastner, Zwettl (AT)

(73) Assignee: Voest-Alpine Industrieanlagenbau GmbH & Co., Linz (AT)

( * ) Notice: Subject to any disclaimer, the term of this patent is extended or adjusted under 35 U.S.C. 154(b) by 0 days.

(21) Appl. No.: 11/322,420

(22) Filed: Jan. 3, 2006

(65) Prior Publication Data

US 2007/0012379 A1    Jan. 18, 2007

Related U.S. Application Data

(63) Continuation of application No. PCT/AT2004/000232, filed on Jul. 1, 2004.

(30) Foreign Application Priority Data

Jul. 4, 2003    (AT) .............................. A 1028/2003

(51) Int. Cl.
*B65B 1/04*    (2006.01)
(52) U.S. Cl. ...................................... 141/286; 414/206
(58) Field of Classification Search ................ 141/286, 141/67, 301; 414/206; 266/184, 192, 190, 266/176, 171

See application file for complete search history.

(56) References Cited

U.S. PATENT DOCUMENTS

| 1,849,658 | A | * | 3/1932 | Brassert ...................... 266/184 |
| 3,009,691 | A | * | 11/1961 | Keiji et al. .................. 432/250 |
| 4,599,028 | A | * | 7/1986 | Mahr et al. .................. 414/206 |
| 4,728,240 | A | * | 3/1988 | Mahr et al. .................... 414/21 |
| 4,887,773 | A | * | 12/1989 | Mehltretter |
| 5,595,482 | A | * | 1/1997 | Parsons |

FOREIGN PATENT DOCUMENTS

| DE | 1 907 224 | * | 9/1970 |
| DE | 2029606 | * | 6/1971 |
| EP | 0 010 627 | * | 12/1981 |
| EP | 0 436 718 | * | 7/1994 |
| EP | 6-256829 | * | 9/1994 |
| FR | 2 674 227 | * | 9/1992 |
| FR | 2 700 606 | * | 7/1994 |
| GB | 2 085 561 | * | 4/1982 |
| JP | 59-226108 | * | 12/1984 |
| JP | 2000-178624 | * | 6/2000 |

* cited by examiner

*Primary Examiner*—Steven O. Douglas
(74) *Attorney, Agent, or Firm*—Dickstein Shapiro LLP

(57) ABSTRACT

A method for loading a pourable material in a container, the material being supplied by gravity forces through a channel which is arranged in the opening of the container. In order to obtain a desired material distribution in the container, the material, a little bit before the passage thereof through the opening, i.e. inside the channel, is exposed to forces modifying the displacement direction of the material given by the channel and the gravity forces.

20 Claims, 3 Drawing Sheets

METHOD FOR LOADING POURABLE MATERIAL AND DEVICE FOR CARRYING OUT SAID METHOD

This is a continuation of International Application No. PCT/AT2004/000232, filed Jul. 1, 2004.

BACKGROUND OF THE INVENTION

1. Field of the Invention

The invention relates to a process for charging a pourable material into a chamber, said material being supplied by gravity forces to an opening of said chamber via a channel, as well as to a device for carrying out said process.

2. Description of the Related Art

Numerous processes and devices for the charging of shaft furnaces such as, for instance, blast furnaces, melter gasifiers, converters or other reactor vessels are known (DE 1 907 224 A, EP 0 436 718 B1, EP 0 010 627 B1, JP 2000178624, JP 59226108 as well as JP 6256829). In all these known processes and devices, the pourable material to be charged gets to an opening of the shaft furnace in the upper region thereof via a channel designed as a downpipe and then falls directly into the interior of the reactor or shaft, respectively, either via a deflection means (e.g. according to DE 1 907 224 A) with the direction of movement being deflected, or without a deflection means (e.g. according to EP 0 436 718 B1 or EP 0 010 627 B1).

If no deflection means is provided, it is virtually impossible to achieve a uniform distribution of the material to be charged in the interior space, and least of all is it possible to effect a desired distribution, for example a preferred charging in the centre of the interior space or a charging preferably in the rim area.

In order to remedy this circumstance, it is already known to arrange distributing elements in the interior of the shaft furnace, which distributing elements permit a deflection of the direction of movement of the charged material, such distributing means can, for example, be arranged in the interior space in a pivotable or also in a slidable manner (cf. DE 1 907 224 A, JP 2000178624 and JP 59226108). However, these known devices have major disadvantages, particularly since the interior space has to be dimensioned larger around the arrangement of said distributing elements, since these elements occupy a certain height range of the interior space. Moreover, distributing elements of said kind are exposed to the strains of the interior space such as, for example, to the atmosphere of the interior space and to the temperature of the interior space so that such distributing elements are subject to substantial wear, in addition to this have to be serviced frequently and, furthermore, quite often cause failures. Furthermore, another disadvantage is that such an arrangement of distributing elements requires an extra-complex construction thereof for being able to withstand the high stresses and strains prevailing in the interior of a reactor or shaft, respectively.

Any attempts to produce relief by means of simple internal fittings such as, for example, by installing chains etc. have, in practice, proven to be of only limited value.

BRIEF SUMMARY OF THE INVENTION

The invention aims at avoiding said disadvantages and difficulties and has as its object to provide a process of the initially described kind as well as a device for carrying out said process, which, in a simple manner, permit a reliable charging of the material to be charged in a precisely desired distribution in the chamber to be charged. Furthermore, the device is supposed to be safe in operation and less cost-intensive than known devices. Moreover, repair works are said to be feasible in a simple way.

According to the invention, said object is achieved in a process of the initially described kind in that the pourable material is exposed closely in front of the passage through the opening, i.e. within the channel, to forces which deflect its direction of movement brought about by the channel and by the gravity forces, with the forces deflecting the direction of movement advantageously being adjustable according to the direction and/or the size.

An additional advantage of the invention is that existing plants for carrying out the process according to the invention can be altered easily, particularly since it is not necessary to interfere with the actual shaft, melter gasifier etc.

Preferably, the process is applied during the charging of ore and/or reduced ore and/or coal with/without slag formers (such as limestone, dolomite, quartz, etc.) into a shaft furnace, in particular into a melter gasifier of a plant for the reduction of ore, in particular iron ore.

A device for carrying out the process according to the invention, wherein the material is allowed to flow toward an opening of the chamber via a channel, is characterized in that a distributing element projecting at least partially into the channel or arranged therein, respectively, and provided adjacent to the opening and directing the flow of material supplied to the opening is provided.

In this case, the distributing element is preferably arranged in a pivotable manner, with the swivelling axis lying inside the channel.

In order to achieve a guidance of the material which is as effective as possible, the swivelling axis and the material flow forming in the channel are suitably closely adjacent to each other. In this connection, it must be noted that the material flow is not distributed evenly in the channel but, e.g. in case of inclined channels, is formed in the lower region thereof.

According to preferred embodiment variants, the swivelling axis is arranged parallel to the surface formed by the opening or the swivelling axis encloses an angle, preferably an angle <60°, with the surface of the opening, with the distributing element extending downwards or upwards from the swivelling axis or in two opposite directions, depending on the respective requirements.

A further preferred variant is characterized in that the distributing element is rotatable around an axis; however, there is also the possibility to arrange the distributing element in a slidable manner.

With regard to the design of the distributing element, there are various preferred variants the application of which depends on various operating conditions such as, for instance, the granulation of the pourable material, the height of the free fall, the diameter of the chamber etc. The distributing element can, for example, be designed as a flat surface, and it can also have a cone-shaped, angular or groove-shaped design. In addition, an advantageous variant is potentially characterized in that the distributing element forms a part of a bell-shaped surface or of a plough surface.

If required, the distributing element is provided with internal cooling.

The invention also relates to a shaft furnace, in particular to a melter gasifier of a plant for the reduction of ore, preferably iron ore.

Another advantage associated with mounting the distributing element in a channel designed as a downpipe is that a replacement of the distributing element can easily be accomplished if necessary.

The downpipes are usually screwed (flange-mounted) to the charging vessel, i.e. the shaft furnace, and thus are easily detachable, i.e. accessibility to a distributing element mounted in the downpipe is easier than to the one located in the charging vessel.

In this case, a gastight flat slide valve can be provided as a separating member between the downpipe and the charging vessel. This has the further advantage that the distributing element can be removed during running operation, i.e. the replacement of the distributing element can be effected at any time in case of repair works or any other operating requirements without having to shut off the plant, which would involve a loss of production.

A further advantage is that perturbing and/or toxic gases and dusts are prevented from escaping into the atmosphere.

The fact that energy losses as a result of pressure or heat losses are prevented can be regarded as an additional advantage.

In existing plants/structures in which the downpipe is not screwed but welded to the charging vessel or shaft furnace, respectively, accessibility to the distributing element is rendered possible by a minor change, namely by providing an assembly opening, a cleaning eye or, if the distributing element is comparatively large, by means of a so-called manhole. Said means can be welded to an existing downpipe with a relatively small effort.

BRIEF DESCRIPTION OF THE DRAWINGS

In the following, the invention is explained in further detail by way of several exemplary embodiments illustrated in the drawing, with FIG. 1 providing a sectional illustration of a specific application in a melter gasifier of a plant for the reduction of ore.

DETAILED DESCRIPTION OF THE INVENTION

Figure 1:
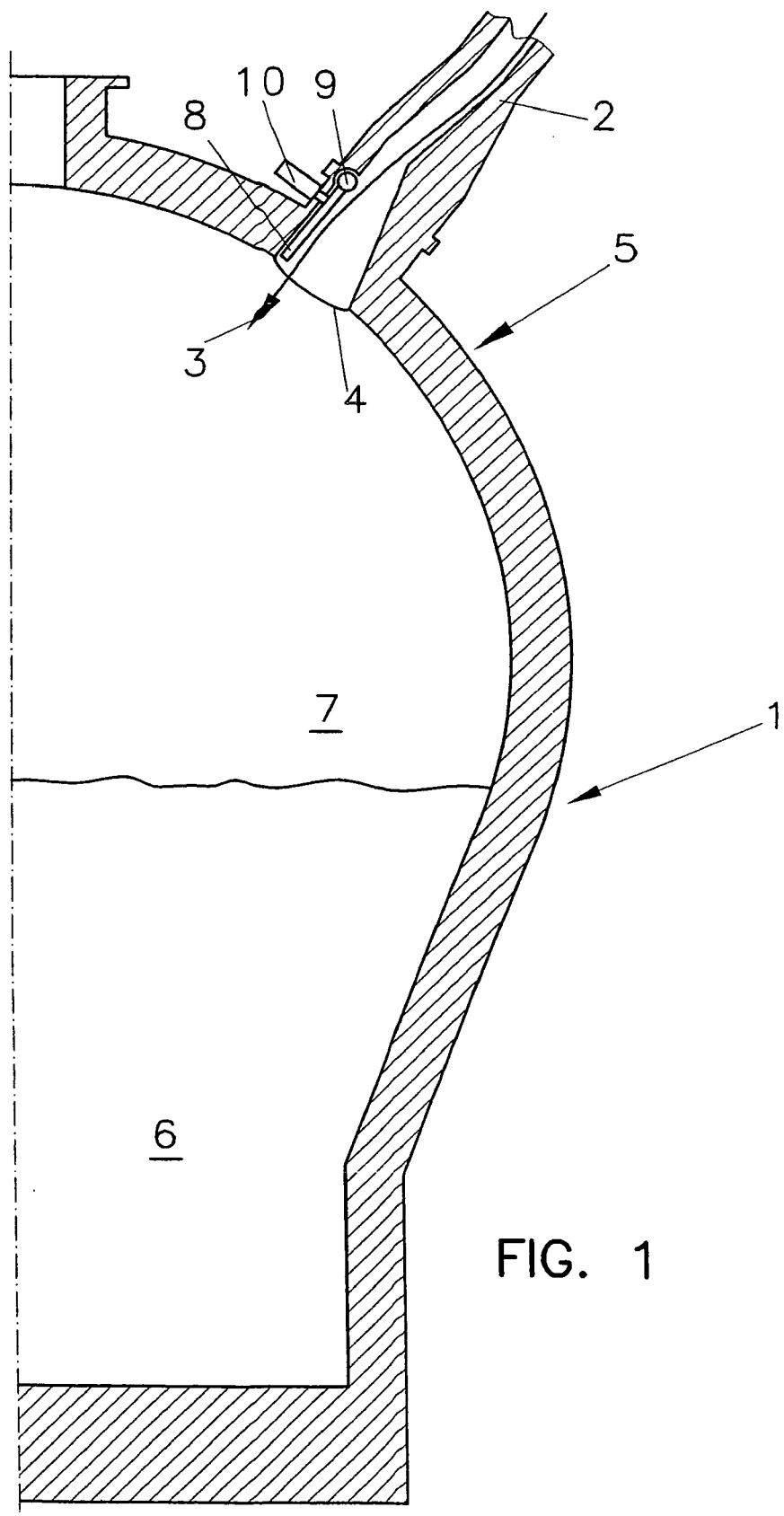

In a melter gasifier 1, a reduced material 3, i.e. sponge iron, is introduced in a pourable state via a channel designed as a downpipe 2 and arranged in an inclined manner. The downpipe 2 runs into an opening 4 in the upper part 5 of the melter gasifier 1, which upper part 5 is designed in the shape of a dome. In the melter gasifier, in a melting-gasifying zone 6 formed by an agitated fixed bed, a reducing gas is produced from carbon carriers such as coal and an oxygen-containing gas which is supplied via a gas discharge pipe (not illustrated further) to a fixed bed (not illustrated further) for the reduction of iron ore, as described, for example, in AT 403.930 B.

In order to introduce the sponge iron 3 as uniformly as possible across the surface of the agitated fixed bed, a distributing element 8 designed as a swivelling flap 8 is provided in the downpipe 2 close to where said downpipe runs into the interior 7 of the melter gasifier 1. The swivelling axis 9 of the distributing element 8 is in this case arranged roughly parallel to the surface of the opening 4 of the melter gasifier 1 into the downpipe 2, with the swivelling flap 8 being of such a length so that it preferably will not project into the interior 7 of the melter gasifier 1.

For the operation of the swivelling flap, a pressure cylinder 10 is provided on the outside of the melter gasifier 1—the adjustment might also be effected pneumatically, electrically or manually. For use in a melter gasifier 1, said swivelling flap is provided with internal cooling so that its service life will be sufficient despite the hot gases in the interior of the melter gasifier 1. However, the swivelling flap is adjusted according to the requirements of the operation (e.g. change in the operation; use of other materials; change in the flow rate; etc.).

Figure 2:
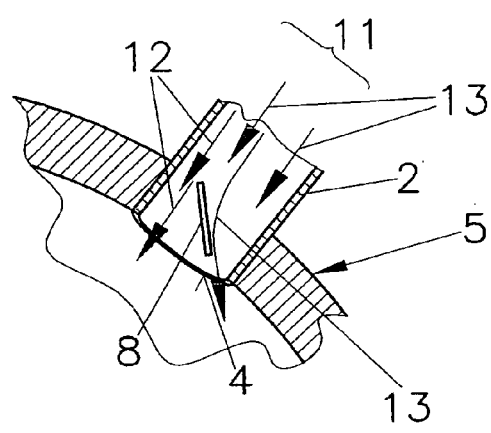
FIGS. 2 to 7 show different variants of the device according to the invention in an illustration analogous to FIG. 1 but on an enlarged scale.

According to the embodiment illustrated in FIG. 2, the distributing element 8 is fixedly arranged in the interior of the downpipe 2 and serves for the partitioning of the strand 11 formed by a pourable material 3 into a portion 12 closer to the centre of the melter gasifier 1 and a portion 13 which is deflected rather closer to the edge.

Figure 3:
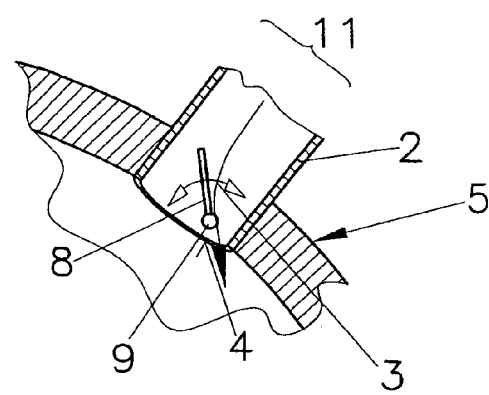
Figure 5:
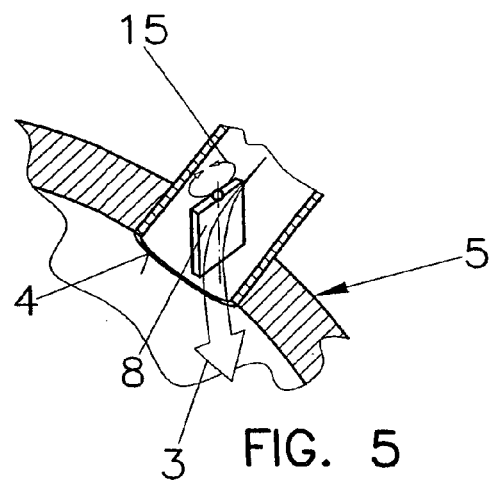
Figure 4:
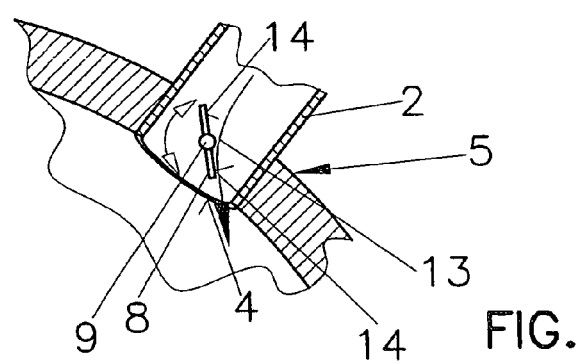
Figure 6:
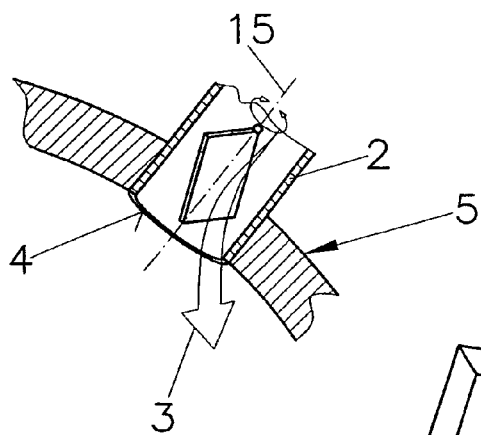

According to FIG. 3, the distributing element 8 is likewise designed as a swivelling flap which, however, is hinged pivotably at its lower end and by means of which it is possible to guide the strand 11 of pourable material 3, depending on the respective position. FIG. 4 shows a swivelling flap 8 with a centrally arranged swivelling axis; said axis is also oriented parallel to the surface of the opening 4. The guide surfaces 14 of the swivelling flap 8 extend diametrically outward from the swivelling axis. FIGS. 5 and 6 illustrate rotatable distributing elements 8, wherein, according to FIG. 5, the axis of rotation 15 encloses an angle smaller than 90° with the surface of the opening 4; according to FIG. 6, an angle of about 90°.

Figure 7:
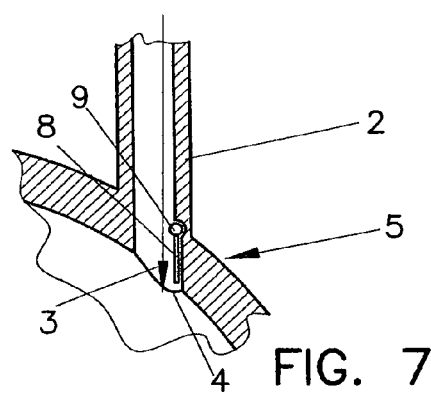

FIG. 7 illustrates a flow of material 3 closely adjacent to the distributing element, i.e. to the swivelling axis 9 thereof.

Figure 13:
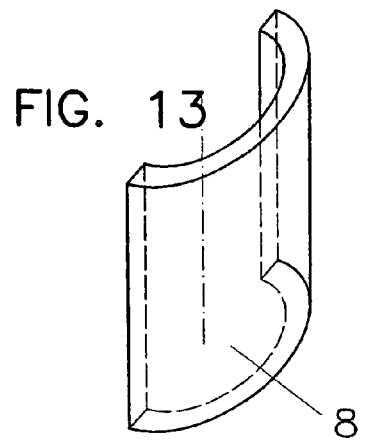
FIGS. 8 to 13 each show, in oblique section, different design possibilities for a distributing element.
Figure 8:
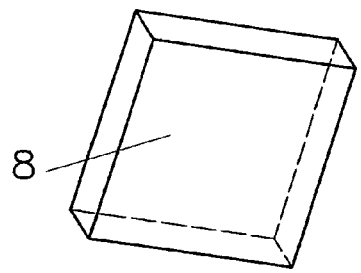
Figure 9:
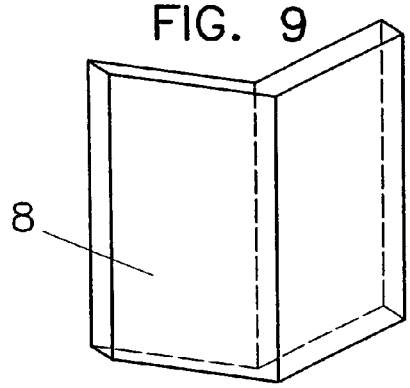
Figure 10:
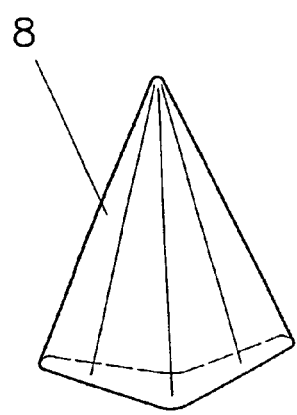
Figure 11:
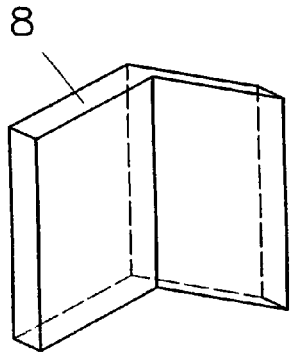
Figure 12:
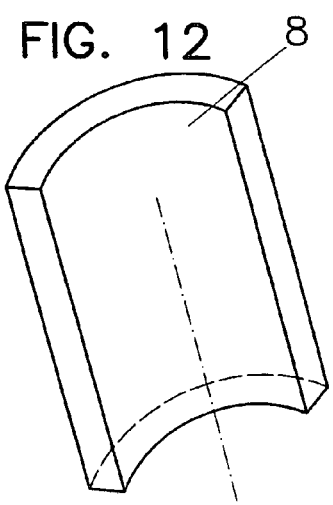

FIGS. 8 to 13 illustrate different embodiments of the distributing element 8, namely flat (FIG. 8), angular (FIG. 9), as part of a bell shape (FIG. 10), and—in FIG. 11—angular but oriented in opposition to the embodiment illustrated in FIG. 9, as well as groove-shaped according to FIGS. 12 and 13.

The invention is not restricted to the illustrated exemplary embodiment but can be used for charging any pourable material into a chamber, whereby, even at low room temperatures, the advantage is provided that the chamber into which charging is to take place is not affected by the distributing element, meaning that it can be utilized fully.

Another possibility arises if rigid distributing means are neither driven nor adjustable but are replaceable. That is, depending on the respective requirement of the operation, distributing elements which are fitted or screwed (and hence are easily replaceable) can be removed from the downpipe 2 and replaced by different ones.

Furthermore, a distribution of the material is rendered possibly by a movable distributing element the movement of which is generated by the falling material.

The invention claimed is:

1. A process for charging a pourable material (3) into a chamber (7), said material being supplied by gravity forces to an opening (4) of said chamber (7) via a channel (2), characterized in that, within the channel (2), an irregular material flow is formed and, closely in front of a passage through the opening (4), is exposed to forces which deflect its direction of movement brought about by the channel and by the gravity forces, wherein the forces deflecting the direction of movement are adjustable according to the direction and/or the size in view of a distribution of the pourable material (3) across the surface of the chamber (7) which is as uniform as possible.

2. A process according to claim 1 for the charging of ore and/or reduced ore and/or coal into a shaft furnace (1), in particular into a melter gasifier of a plant for the reduction of ore, in particular iron ore.

3. A device for carrying out a process according to claim 1, wherein the pourable material (3) is allowed to flow toward an opening (4) of the chamber (7) via a channel (2), characterized in that a distributing element (8) arranged in the channel (2) and adjacent to the opening (4) is provided, wherein the distributing element (8)
represents a flat surface and is arranged in such a manner that a guidance and a partitioning of the pourable material flow (11) into the portions (12) and (13) will take place, with one portion being deflected closer to the centre of the chamber (7) and one portion being deflected rather closer to the edge.

4. A device according to claim 3, characterized in that the distributing element (8) is rotatable around an axis (15).

5. A device according to claim 3, characterized in that the distributing element (8) is provided with internal cooling.

6. A shaft furnace (1), in particular a melter gasifier (1) of a plant for the reduction of ore, preferably iron ore, characterized by a device according to claim 3.

7. A device according to claim 3, wherein the distributing element (8) is fixedly arranged.

8. A device according to claim 3, wherein the distributing element (8) is pivotably arranged.

9. A device according to claim 3, wherein the distributing element (8) is rotatably arranged.

10. A device for carrying out a process according to claim 1, wherein the pourable material (3) is allowed to flow toward an opening (4) of the chamber (7) via a channel (2), characterized in that a distributing element (8) arranged in the channel (2) and adjacent to the opening (4) is provided, wherein the distributing element (8) includes a swiveling axis (9) and is located at the wall of the channel (2).

11. A device according to claim 10, characterized in that the swiveling axis (9) is arranged parallel to the surface formed by the opening (4).

12. A device according to claim 10, characterized in that the swiveling axis (9) encloses an angle, preferably an angle <60°, with the surface of the opening (4).

13. A device according to claim 10, characterized in that the distributing element (8) extends downwards from the swiveling axis (9).

14. A device according to claim 10, characterized in that the distributing element (8) extends upwards from the swiveling axis (9).

15. A device according to claim 10, characterized in that the distributing element (8) extends with roughly the same extension from the swiveling axis (9) in two opposite directions.

16. A device according to claim 10 wherein the distributing element (8) has a cone-shaped design.

17. A device according to claim 10 wherein the distributing element (8) has a angular-shaped design.

18. A device according to claim 10 wherein the distributing element (8) has a groove-shaped design.

19. A device according to claim 10 wherein the distributing element (8) is designed as part of a bell-shaped surface.

20. A device according to claim 10 wherein the distributing element (8) is designed as a plough surface and is arranged in a pivotable manner.

* * * * *